United States Patent
Ball et al.

(10) Patent No.: US 9,718,558 B2
(45) Date of Patent: Aug. 1, 2017

(54) PILOT CENTERED SYSTEM AND METHOD FOR DECLUTTERING AIRCRAFT DISPLAYS

(71) Applicant: HONEYWELL INTERNATIONAL INC., Morristown, NJ (US)

(72) Inventors: Jerry Ball, Peoria, AZ (US); Roger W. Burgin, Scottsdale, AZ (US); Emmanuel Letsu-Dake, Shakopee, MN (US); Dave Pepitone, Sun City West, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 316 days.

(21) Appl. No.: 14/190,719

(22) Filed: Feb. 26, 2014

(65) Prior Publication Data
US 2015/0239574 A1    Aug. 27, 2015

(51) Int. Cl.
- G01C 23/00    (2006.01)
- B64D 45/00    (2006.01)
- G08G 5/00    (2006.01)

(52) U.S. Cl.
CPC ........... B64D 45/00 (2013.01); G01C 23/00 (2013.01); G08G 5/0021 (2013.01); G08G 5/0052 (2013.01)

(58) Field of Classification Search
CPC ................. G01C 23/00; G08G 5/04
See application file for complete search history.

(56) References Cited

U.S. PATENT DOCUMENTS

| | | |
|---|---|---|
| 3,680,086 A | 7/1972 | Valstar |
| 4,489,389 A | 12/1984 | Beckwith et al. |
| 4,660,157 A | 4/1987 | Beckwith et al. |
| 5,297,051 A | 3/1994 | Arakawa et al. |
| 5,396,430 A | 3/1995 | Arakawa et al. |
| 5,410,485 A | 4/1995 | Ichikawa |
| 5,689,717 A | 11/1997 | Pritt |
| 6,154,219 A | 11/2000 | Wiley et al. |
| 6,289,278 B1 | 9/2001 | Endo et al. |
| 6,314,363 B1 | 11/2001 | Pilley et al. |
| 6,453,234 B1 | 9/2002 | Noguchi et al. |
| 6,466,235 B1 | 10/2002 | Smith et al. |
| 6,493,630 B2 | 12/2002 | Ruiz et al. |
| 6,565,610 B1 | 5/2003 | Wang et al. |
| 6,940,530 B2 | 9/2005 | Chen et al. |

(Continued)

FOREIGN PATENT DOCUMENTS

EP    2816540 A2    12/2014

OTHER PUBLICATIONS

USPTO Office Action for U.S. Appl. No. 13/154,130 dated Oct. 17, 2012.

(Continued)

*Primary Examiner* — Yonel Beaulieu
*Assistant Examiner* — Martin Weeks
(74) *Attorney, Agent, or Firm* — Lorenz & Kopf, LLP (57) ABSTRACT

A system and method are provided for decluttering an aircraft display. Chart data, flight data and user input data are obtained. User input data reflects pilot preferences. A modified combination of chart data and flight data is generated in response to user input data. Symbology that is graphically representative of the modified combination is displayed.

12 Claims, 9 Drawing Sheets

(56) References Cited

U.S. PATENT DOCUMENTS

| | | |
|---|---|---|
| 7,072,746 B1 | 7/2006 | Burch |
| 7,089,110 B2 | 8/2006 | Pechatnikov et al. |
| 7,231,599 B2 | 6/2007 | Yamada et al. |
| 7,414,637 B2 | 8/2008 | Fogel et al. |
| 7,542,882 B2 | 6/2009 | Agrawala et al. |
| 7,551,994 B2 | 6/2009 | Odinak et al. |
| 7,685,083 B2 | 3/2010 | Fairweather |
| 7,693,621 B1 | 4/2010 | Chamas |
| 8,126,214 B2 | 2/2012 | Morbey et al. |
| 8,164,487 B1 | 4/2012 | Tsai |
| 8,380,366 B1 | 2/2013 | Schulte et al. |
| 8,532,844 B2 | 9/2013 | Wilson et al. |
| 2003/0009694 A1 | 1/2003 | Wenocur et al. |
| 2003/0169301 A1 | 9/2003 | McCauley et al. |
| 2007/0096945 A1 | 5/2007 | Rasmussen et al. |
| 2007/0182589 A1* | 8/2007 | Tran .................. 340/961 |
| 2008/0140270 A1 | 6/2008 | Davis et al. |
| 2008/0147320 A1 | 6/2008 | Burch |
| 2008/0215193 A1* | 9/2008 | Hanson .................. 701/3 |
| 2008/0291918 A1* | 11/2008 | Turcot ............... 370/395.3 |
| 2009/0315881 A1 | 12/2009 | Matsumoto et al. |
| 2010/0114483 A1 | 5/2010 | Heo et al. |
| 2010/0131481 A1 | 5/2010 | Suddreth et al. |
| 2010/0148990 A1 | 6/2010 | Burgin et al. |
| 2010/0161160 A1 | 6/2010 | Wilson et al. |
| 2010/0220113 A1 | 9/2010 | Kennedy |
| 2010/0241021 A1 | 9/2010 | Morikawa et al. |
| 2012/0035849 A1 | 2/2012 | Clark et al. |
| 2012/0036016 A1* | 2/2012 | Hoffberg ............ 705/14.58 |
| 2013/0035848 A1 | 2/2013 | Burgin et al. |

OTHER PUBLICATIONS

USPTO Final Office Action for U.S. Appl. No. 13/154,130 dated May 15, 2013.
USPTO Notice of Allowance for U.S. Appl. No. 13/154,130 dated Jan. 27, 2014.
MFD STD, TRF, RDR, RDR/TRF With or Without Chartview Available; Retrieved from Internet:, <URL: www.apgavionics.com/product.php?p_id=471>.
Garmin, G1000 Multi Function Display Pilot's Guide for Cessna Nav III; 190-00392-02 Rev. A; 2004 Garmin Ltd.
Avidyne, Entegra EX5000C, Cirrus SR20 and SR22 Multi-Function Display Pilot's Guide; 600-00108-000 Rev 07, 2007 Avidyne Corporation.
Abhizna Butchibabu, et al.; Evaluating a De-Cluttering Technique for NextGen RNAV and RNP Charts; submitted for publication to the 31st Digital Avionics Systems Conference Oct. 14-18, 2012, Williamsburgh, VA.
EP Extended Search Report for Application No. EP 14197510.2, dated Jun. 24, 2015.

* cited by examiner

PILOT CENTERED SYSTEM AND METHOD FOR DECLUTTERING AIRCRAFT DISPLAYS

STATEMENT REGARDING FEDERALLY SPONSORED RESEARCH OR DEVELOPMENT

This invention was made with Government support under DTFAWA-10-A-80031 awarded by Federal Aviation Administration. The Government has certain rights in the invention.

TECHNICAL FIELD

Embodiments described herein relate generally to aircraft display systems and, more particularly, to a pilot centered system and method for decluttering aircraft displays to reduce pilot cognitive workload and increase safety.

BACKGROUND

Pilots are responsible for quickly viewing and comprehending information that generally falls into two categories. The first category of information is flight data, which provides flight path information. The majority of flight data is organized in "information layers" (e.g., flight path information, Navigational Aids (NAVAID), airspace information, terrain information, weather information, traffic information, and the like). These information layers are combined to provide a unified graphical display of flight path data (hereinafter this unified display is referred to as a "navigation display") on the aircraft display system. The second category of information is chart data that includes procedural information generally derived from paper charts and documents. The current navigation display does not include information provided by chart data, and in some cases, the chart data is still in paper form. In other cases, the chart data has been scanned and is digitally displayed on a separate aircraft display unit (hereinafter the scanned and visually displayed chart data is referred to as "digital instrument charts").

These two categories of information are obtained in different pilot preflight preparation steps. Initially, pilots interact with aircraft systems by entering a flight plan (e.g., departure and destination airports), and a phase of flight. Pilots brief each other on the departure or arrival procedures. Examples of phase of flight include departure, enroute, arrival, holds, approach, missed approach, landing/taxi, or the like. In response to the pilot entered information, a flight management system (FMS) provides associated flight path navigation data retrieved from one or more databases. Next, the pilot identifies and enters into the aircraft system the relevant flight procedures. Examples of common flight procedures include: instrument approach procedures (IAP), departure procedures (DP), standard terminal arrival procedures (STAR), charted visual flight procedures (CVFP), airport diagram procedures (AD) and the like.

Each procedure includes a set of elements, which are generally detailed instructions. For example, instrument approach procedures provide instrument flight descent instructions for an enroute environment to land safely at an airfield; departure procedures provide a simplified method of departing an airport while providing a means to move air traffic efficiently, safely and quickly out of the congested airspace associated with airports; departure procedures that may also provide obstacle avoidance guidance and the ability to take off in reduced visibility; and airport diagram procedures that provide a structured means to maneuver around a busy airport surface environment.

As mentioned, the procedural information is often derived from paper charts. Paper charts can be very complex, often having a large amount of information compressed into a small space. The compression of information may reduce the font to an unreadable size. When paper charts are scanned and displayed on an aircraft display the pilot may be able to alleviate some viewing issues by zooming in and out; however, the pilot is unable to prioritize or filter the displayed information. Regardless, digital instrument charts introduce an additional aircraft display unit, often causing pilots to have to switch their focus back and forth between the digital instrument chart and a navigation display, increasing their cognitive workload. Furthermore, a direct combination of chart data and flight data would provide an amount of information that is too excessive to display on a single display, in an intuitive and readily comprehensible manner.

A cluttered display is defined as one that presents an excessive number or variety of symbols, colors, and/or other unnecessary information and, depending on the situation, in a way that may interfere with the flight task or operation (FAA AC 25-11A Electronic Flight Deck Displays). When the display is cluttered, the head down time and cognitive workload of the pilot or crew increases. In addition to resolving clutter issues, pilots may wish to customize and simplify the aircraft display with additional techniques, such as controlling the location and orientation of specific notes and labels, changing font size, removing arrowheads from pointers, and the like.

Considering the foregoing, it is desirable to provide a pilot centered system and method for (1) decluttering aircraft displays that is capable of blending, based on pilot preferences, flight data and chart data into a modified combination and (2) displaying the modified combination on a singular aircraft display, thus providing a single, blended display for the pilot to scan and acquire all of the necessary information needed to execute relevant procedures (hereinafter the desired pilot centered system is referred to as a "decluttering system"). It is also desirable to provide a decluttering system that responds to pilot preferences for controlling the location and orientation of specific notes and labels, changing font size, and removing arrowheads from pointers. The desired decluttering system minimizes cognitive workload.

BRIEF SUMMARY

This summary is provided to introduce a selection of concepts in a simplified form that are further described below in the detailed description. This summary is not intended to identify key or essential features of the claimed subject matter, nor is it intended to be used as an aid in determining the scope of the appended claims.

A pilot-centered method for decluttering an aircraft display is provided. The method obtains chart data, flight data and user input data. A modified combination of chart data and flight data is generated in response to user input data. Symbology that is graphically representative of the modified combination is displayed.

A pilot-centered system for decluttering an aircraft display is also provided. The system includes a source of flight data, a source of chart data, and a user interface configured to obtain user input data. A graphics module is included that is coupled to the source of flight data and the source of chart data. A processor is included that is coupled to the graphics module and the user interface. Based on user input data, the processor is configured to direct the graphics module to generate a modified combination of flight data and chart data. A display device is coupled to the graphics module, and renders symbology that is graphically representative of the modified combination of data.

Also provided is a pilot-centered method for decluttering an aircraft display. Chart data is obtained and flight data is obtained. User input data is obtained and, aircraft location information is obtained. In response to the user input data and the aircraft location data, a modified combination of chart data and flight data is generated. A graphic representation of the modified combination is then displayed.

Other desirable features will become apparent from the following detailed description and the appended claims, taken in conjunction with the accompanying drawings and this background.

BRIEF DESCRIPTION OF THE DRAWINGS

A more complete understanding of the subject matter may be derived by referring to the detailed description and claims when considered in conjunction with the following figures, wherein like reference numerals refer to similar elements throughout the figures, and wherein:

DETAILED DESCRIPTION

The following Detailed Description is merely exemplary in nature and is not intended to limit the invention or the application and uses of the invention. Although the subject matter is described herein in an aviation context, it should be understood that the subject matter may be similarly utilized in other applications involving a predefined route for travel (e.g., a travel plan or travel route) or with another vehicle (e.g., automobiles, marine vessels, trains), and the subject matter described herein is not intended to be limited to an aviation environment. Furthermore, there is no intention to be bound by any theory presented in the preceding Background or the following Detailed Description.

For the sake of brevity, conventional techniques related to graphics and image processing, navigation, flight planning, aircraft controls, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Figure 1:
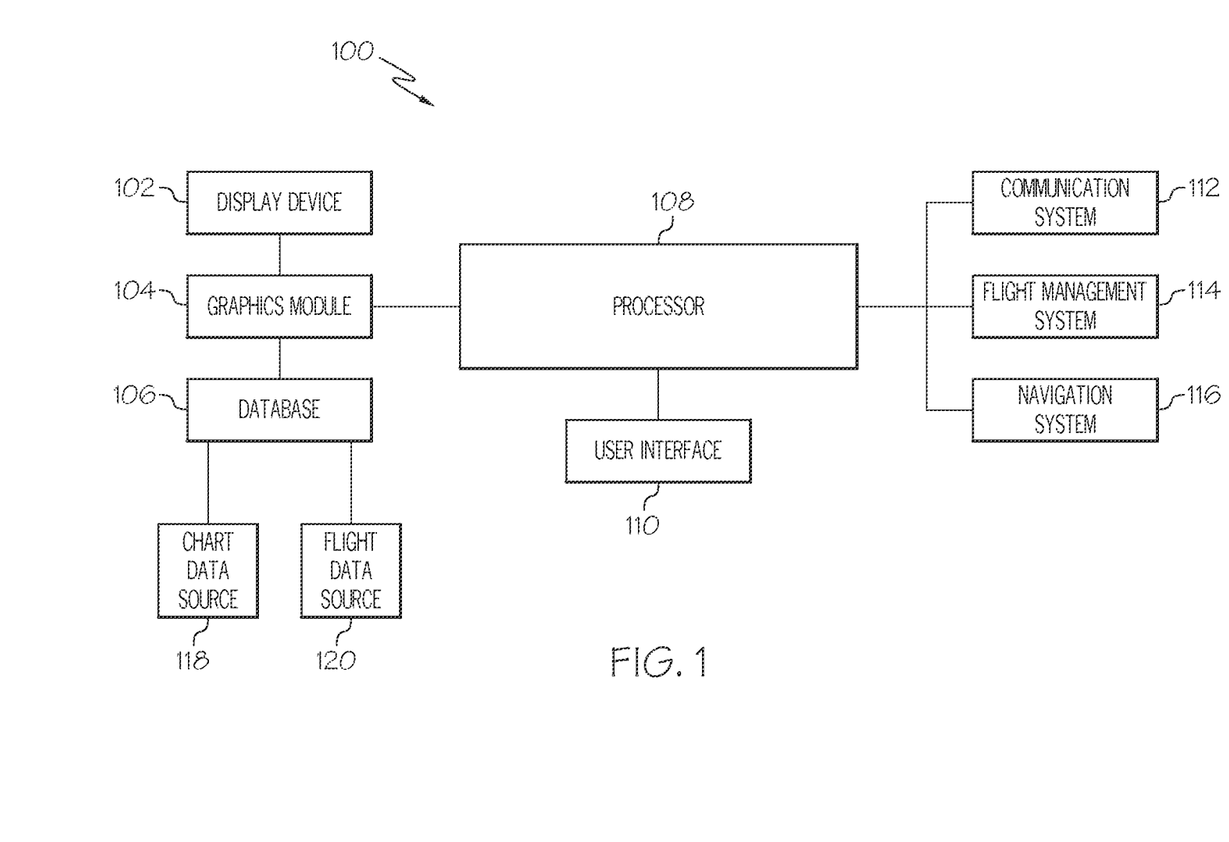
FIG. 1 is a block diagram of a decluttering system in accordance with an exemplary embodiment.

FIG. 1 is a block diagram of a decluttering system 100 in accordance with an exemplary embodiment, which may be located onboard a vehicle such as an aircraft. In an exemplary embodiment, the decluttering system 100 includes, without limitation, a display device 102, a navigation system 116, a communications system 112, a flight management system 114 (FMS), a processor 108, and a graphics module 104. The decluttering system 100 may further include a user interface 110 for providing input and enabling interactivity with the decluttering system 100 and a database 106 suitably configured to support operation of the decluttering system 100, as described in greater detail below. The database 106 obtains data from sources such as, but not limited to, a chart data source 118 and a flight data source 120. It should be understood that FIG. 1 is a simplified representation of a decluttering system 100 for purposes of explanation and ease of description, and FIG. 1 is not intended to limit the application or scope of the subject matter in any way. In practice, the decluttering system 100 will include numerous other devices and components for providing additional functions and features, as will be appreciated in the art. For example, the decluttering system 100 may include one or more aircraft systems (e.g., a weather system, an air traffic management system, a radar system, a traffic avoidance system) coupled to the flight management system 114, the database 106, and/or the processor 108 for obtaining and/or providing real-time flight-related information that may be displayed on the display device 102.

In an exemplary embodiment, the display device 102 is coupled to the graphics module 104, and the graphics module 104 is coupled to the processor 108. The processor 108 and the graphics module 104 are cooperatively configured to display, render, or otherwise convey one or more graphical representations or images associated with operation of the aircraft on the display device 102, as described in greater detail below. The processor 108 is coupled to the navigation system 116 for obtaining real-time navigational data and/or information regarding operation of the aircraft to support operation of the decluttering system 100. In an exemplary embodiment, the communications system 112 is coupled to the processor 108 and configured to support communications to and/or from the aircraft, as will be appreciated in the art. The processor 108 is also coupled to the flight management system 114, which in turn, may also be coupled to the navigation system 116 and the communications system 112, for providing real-time data and/or information regarding operation of the aircraft to the processor. In an exemplary embodiment, the user interface 110 is coupled to the processor 108, and the user interface 110 and the processor 108 are cooperatively configured to allow a user to input user preferences, provide information, and to interact with the display device 102 and other elements of decluttering system 100, as described in greater detail below.

In an exemplary embodiment, the display device 102 is realized as an electronic display configured to graphically display flight information or other data associated with operation of the aircraft under control of the graphics module 104. In an exemplary embodiment, the display device 102 is located within a cockpit of an aircraft. It will be appreciated that although FIG. 1 shows a single display device 102, in practice, additional display devices may be present.

In an exemplary embodiment, the navigation system 116 is configured to obtain one or more navigational parameters associated with operation of the aircraft. The navigation system 116 may be realized as a global positioning system (GPS), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 116, as will be appreciated in the art. In an exemplary embodiment, the navigation system 116 is capable of obtaining and/or determining the instantaneous position of an aircraft, that is, the current location of the aircraft (e.g., the latitude and longitude) and the altitude or above ground level for the aircraft. In some embodiments, the navigation system 116 may also obtain and/or determine the heading of the aircraft (i.e., the direction the aircraft is traveling in relative to some reference). In an exemplary embodiment, the communications system 112 is suitably configured to support communications between an aircraft and another aircraft or ground location (e.g., air traffic control). In this regard, the communications system 112 may be realized using a radio communication system or another suitable data link system.

In an exemplary embodiment, the flight management system 114 (or, alternatively, a flight management computer) is located onboard an aircraft. Although FIG. 1 is a simplified representation of decluttering system 100, in practice, the flight management system 114 may be coupled to one or more additional modules or components as necessary to support navigation, flight planning, and other aircraft control functions in a conventional manner.

In an exemplary embodiment, the flight management system 114 maintains information pertaining to a current flight plan (or alternatively, a current route or travel plan), in coordination with the flight data source 120. Depending on the embodiment, the current flight plan may comprise either a selected or otherwise designated flight plan for subsequent execution, a flight plan selected for review on the display device 102, and/or a flight plan currently being executed by the aircraft. In this regard, as used herein, a flight plan should be understood as a sequence of navigational reference points that define a flight path or route for an aircraft. In this regard, depending on the particular flight plan and type of air navigation, the navigational reference points may comprise navigational aids, such as VHF Omni-directional ranges (VORs), distance measuring equipment (DMEs), tactical air navigation aids (TACANs), and combinations thereof (e.g., VORTACs), landing and/or departure locations (e.g., airports, airstrips, runways, landing strips, heliports, helipads, and the like), points of interest or other features on the ground, as well as position fixes (e.g., initial approach fixes (IAFs) and/or final approach fixes (FAFs)) and other navigational reference points used in area navigation (RNAV). For example, a flight plan may include an initial or beginning reference point (e.g., a departure or takeoff location), a final navigational reference point (e.g., an arrival or landing location), and one or more intermediate navigational reference points (e.g., waypoints, positional fixes, and the like) that define the desired path or route for an aircraft from the initial navigational reference point to the final navigational reference point. Accordingly, the intermediate navigational reference points may define one or more airways for the aircraft en route to the final navigational reference point. Each type of reference point (e.g., initial, final, intermediate navigational, waypoints, positional fixes, etc.) may be represented by a unique symbol as described hereinbelow.

The database 106 obtains data from at least a flight data source 120 and a chart data source 118. The processor 108, in response to user input data (a user input request) via the user interface 110, directs the graphics module 104 to modify, or blend, the chart data and flight data according to user input data obtained through the user interface 110. Graphics module 104 then drives display device 102 with symbology representative of the modification of combined flight data and chart data. Examples of user input requests include cursor movements (also referred to as hovering); ranging in and out (also referred to as zooming in and out); suppressing notes and symbols; adding and placing notes and symbols (placing a note at a location on a moving map display is referred to as "stick pin" functionality); changing font size; holding text horizontal on the display, for readability, regardless of the aircraft orientation; and the like. In response to user input requests, the processor 108 directs the graphics module to modify, or blend the chart data and flight data to enable a graphic display responsive to the user input request.

The processor 108 may be implemented or realized with a general purpose processor, a content addressable memory, a digital signal processor, and application specific integrated circuit, a field programmable gate array, any suitable programmable logic device, discrete gate or transistor logic, discrete hardware components, or any combination designed to perform the functions described herein. A processor device may be realized as a microprocessor, a controller, a microcontroller, or a state machine. Moreover, a processor device may be implemented as a combination of computing devices, e.g., a combination of a digital signal processor and a microprocessor, a plurality of microprocessors, one or more microprocessors in conjunction with a digital signal processor core, or any other such configuration.

The display device 102 selectively renders symbology that is graphically representative of the modified combination of flight data and chart data and thereby supplies visual feedback to the user. The symbology includes various symbolic, textual, and/or graphic data as illustrated in figures four through nine. It will be appreciated that the display device 102 may be implemented using any one of numerous known display devices suitable for rendering textual, graphic, and/or iconic information in a format viewable by the user. Non-limiting examples of such display devices include various multifunction displays (MFD), Near to Eye (NTE) projection displays, cathode ray tube (CRT) displays, and flat screen displays such as LCD (liquid crystal display) and TFT (thin film transistor) displays. The display device 102 may additionally be implemented as a screen mounted display, or any one of numerous known technologies. It is additionally noted that the display device 102 may be configured as any one of numerous types of aircraft flight deck displays. For example, it may be configured as a multi-function display, a horizontal situation indicator, a vertical situation indicator, or the like. In the depicted embodiment, however, at least one display device 102 is configured as a primary flight display (PFD).

In an exemplary embodiment, the user interface 110 is also located within the cockpit of an aircraft and adapted to allow a user (e.g., pilot, co-pilot, or crew member) to interact with the decluttering system 100 and enables a user to indicate, select, provide, or otherwise manipulate content displayed on the display device 102, as described in greater detail below. In various embodiments, the user interface 110 may be realized as a keypad, touchpad, keyboard, mouse, touchscreen, joystick, knob, microphone, speech recognition, gestures or another suitable device adapted to receive input from a user. The various types of user input data may include layer/priority selection information, range in/range out (often referred to as zoom functionality), notes, font size changes, and the like. User input data may be changed at initial preparation, as well at any other time during travel.

As described herein, the chart data source 118 is the collection of digital elements that make up a chart. As an example one digital element, but not limited to, would be a Minimum Sector Altitude (MSA) symbol, which would have data for location, radius and sector bearing beginning and ending and minimum altitude for that sector. Each additional sector has its own symbol, location, radius sector bearing beginning and ending, and minimum altitude.

Chart data can be broken down into a multiplicity of elements. Chart data elements include procedures, objects that are navigational aids (for example, departure and arrival airports), symbols (for example, dots, circles and triangles), and dialogue notes (for example, text within tables or boxes and chart notes). FIGS. 4 through 9 present various illustrations of aircraft display screens showing procedures, objects, symbols and notes. Each procedure, in turn, may have a set of elements. In addition, there are two kinds of notes; general notes that apply to the entire procedure (for example, note A, note B, and note C shown in FIG. 4) and specific notes that apply to a certain area on a chart (for example, note 416 in FIG. 4). Notes are textual, with a default font size, and default orientation. The defaults may be adjusted by the processor 108 according to user preference input. The processor 108 will link or attach notes to associated geolocations on the moving map and the display of the notes are determined by phase of flight constraints and criticality (this functionality may be referred to as "stick-pin" notes) according to user preference input. Also, in response to user preference input, the processor 108 may automatically resize font and allow labels or notes to rotate on the screen as the aircraft changes course, in order to maintain readability. See, for example, STEP 226 in FIG. 2.

Figure 2:
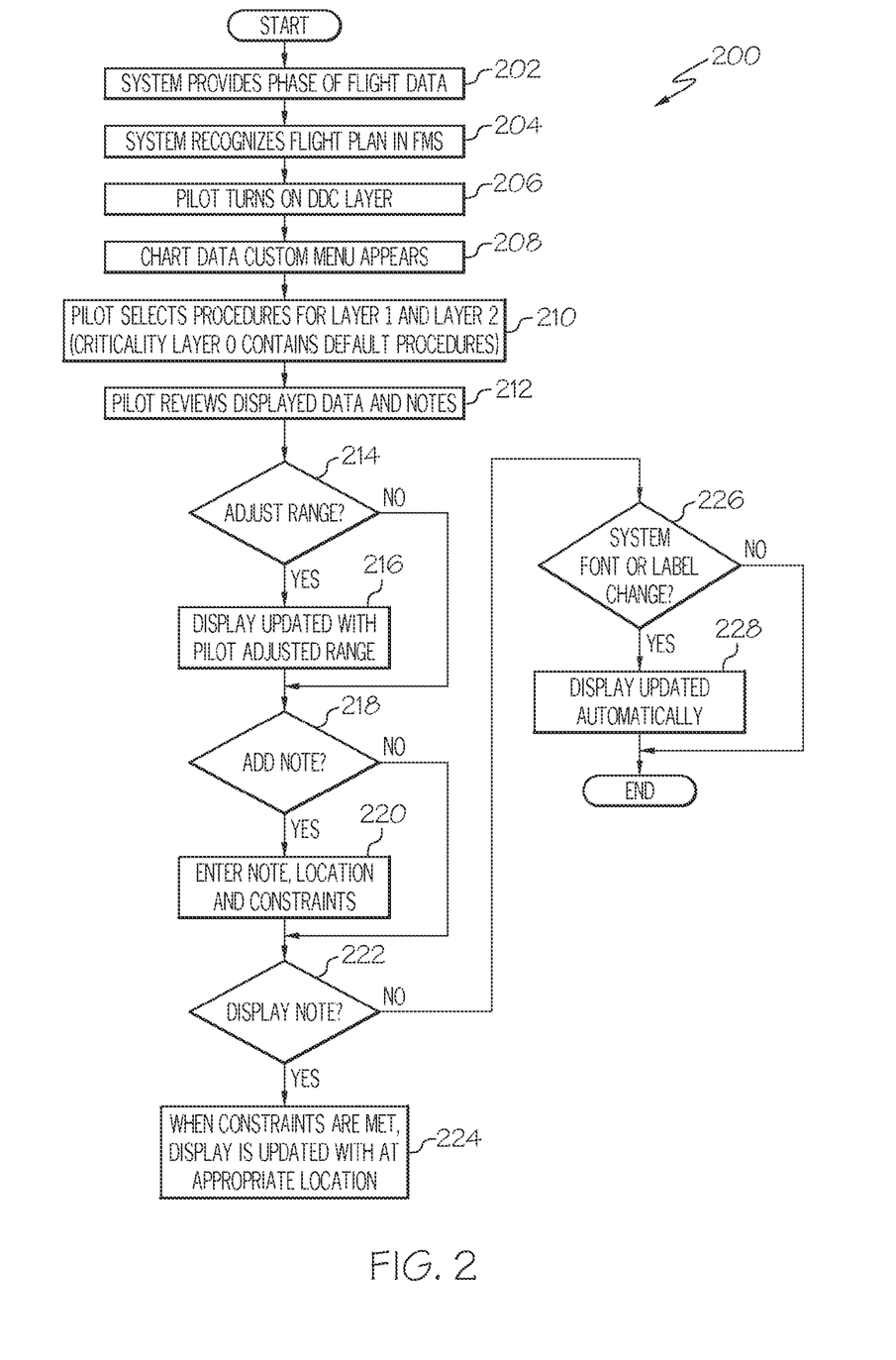
FIG. 2 is a flow chart describing the steps of a decluttering process in accordance with an exemplary embodiment.

FIG. 2 is a flow chart describing steps of a decluttering process 200 in accordance with an exemplary embodiment. The system provides the phase of flight data STEP 202 into the decluttering system 100, and the flight plan into the FMS at STEP 204; flight data is obtained from the flight data source 120. Next, the pilot turns on the digital data control (DDC) layer at STEP 206 and the 'chart data custom menu' appears at STEP 208, wherein the decluttering system 100 displays the chart data associated with the flight path, as described herein.

Figure 3:
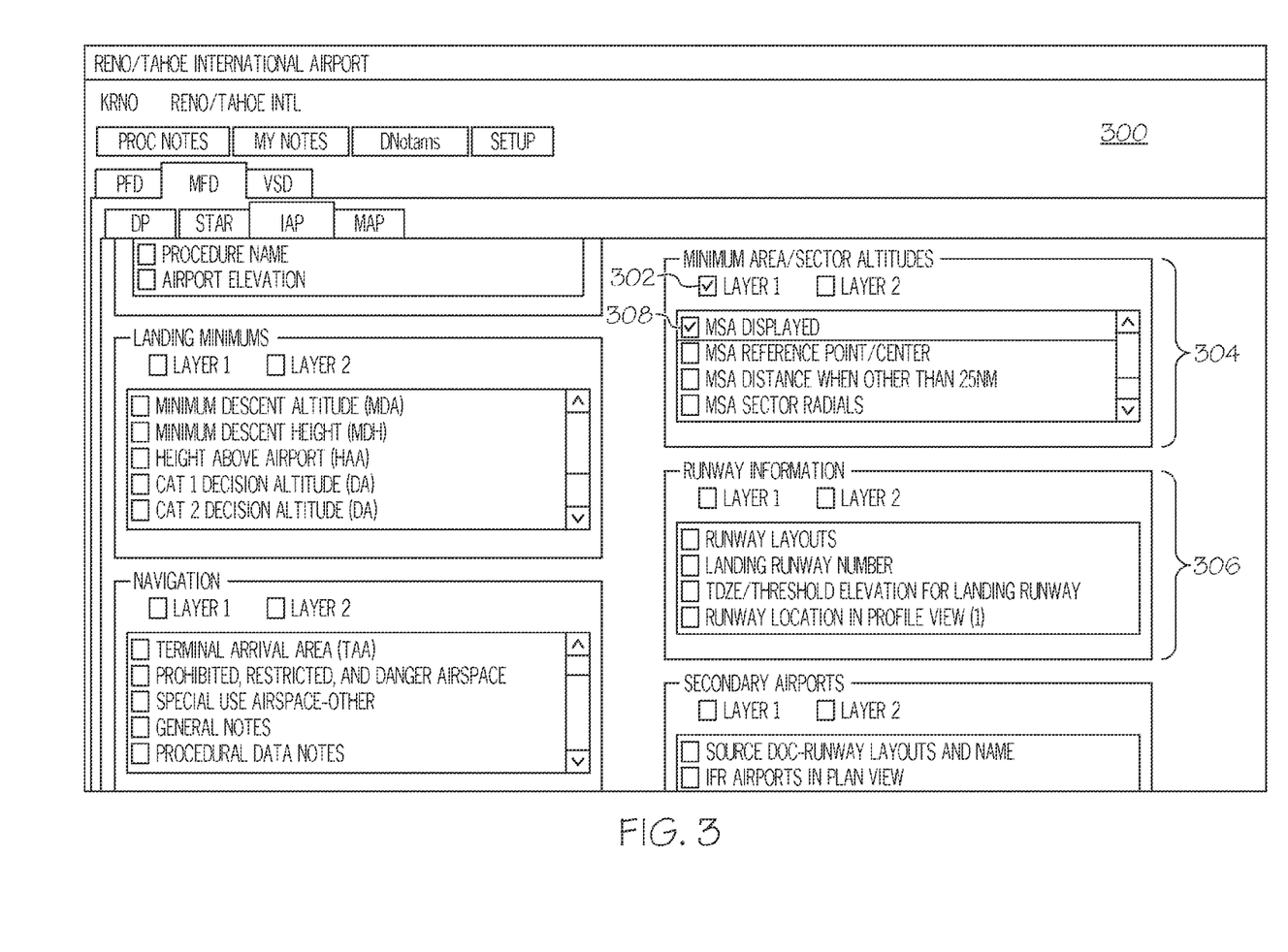
FIG. 3 illustrates an exemplary layer selection display.

In this exemplary embodiment, chart data is prioritized. Prioritization provides the pilot the ability to customize what is displayed on the screen according to pilot preferences that are provided, as user input data, at the user interface device 110. Some procedures or procedure elements are considered critical, and are automatically assigned by the processor 108 to have critical priority status. The exemplary embodiment first identifies the most critical chart data elements and puts them into the critical layer; the pilot may not alter chart data elements in the critical layer. Of the non-critical chart data elements, the pilot may create two or more different views of chart data elements (hereinafter the two views are referred to as layer one and layer two) according to pilot preference at STEP 210. The pilot may prioritize entire procedures, elements of procedures, or various combinations thereof. The pilot identifies chart data elements as priority one by selecting them as layer one items. The pilot identifies chart data elements as priority two by selecting them as layer two items. FIG. 3 is an example of an exemplary display screen presented to the pilot for layer/priority selection. Some of the customization offered by decluttering system 100 is accomplished at STEP 210; i.e., the pilot selects procedure elements for layer one and layer two.

Regardless of the pilot's layer one and layer two selections, it should be noted that there is a temporal component to the critical layer. In addition to initial assignment, by the processor 108, of certain elements to the critical layer, the processor 108 continually evaluates input from the systems, interfaces and data sources coupled to the processor. Additionally, the aircraft position on the moving map is continually updated. In response to any of the aforementioned input to the processor 108, the processor 108 may direct the graphics module 104 to present critical information on the display device 102.

The pilot may then proceed to review the graphical display views generated by the decluttering system 100 in accordance with the user input data at STEP 212. At this point, the pilot is able to review the newly created views referred to as layer one and layer two, and to review the critical layer. The pilot may toggle back and forth between displaying the various views to confirm that pilot preference has been met. As part of the review, the pilot may review each procedure within each layer, and review the elements of the procedures within each layer. As described herein, the each pilot preference input is obtained via the user interface 110, in response to which the processor 108 drives the graphics module 104 to generate blended chart data and flight data for display device 102 such that the display is responsive the pilot preference input. Further examples of pilot preference input follow.

The exemplary embodiment supports further pilot customization of the views generated at STEP 212, as shown in STEP 214 through STEP 228. While STEP 214 through STEP 228 are arbitrarily shown to be in a sequence shown in decluttering process 200, in practice, these steps may be rearranged, and additional customization steps may be added. For example, an additional customization step called "heads-up mode" is provided, in which the labels and notes appear to rotate about the center of the screen as the course changes, minimizing the chance of obscuring other notes.

At STEP 214, the pilot may adjust the range (i.e., zoom) setting, and the display is updated with the new range at STEP 216. Adjusting the range provides the pilot with an opportunity to suppress or minimize the display of a predetermined subset of chart data elements. When the range setting is high (i.e., a large area is displayed), as an example, a predetermined subset of chart data representing notes and symbols may be replaced by a symbolic representation in order to declutter the display. The symbolic representation is used to indicate the location on the moving map where a predetermined subset of chart data has been suppressed. (See, for example, symbol 702 in FIG. 7, as compared to the textual information at arrow 612 in FIG. 6). In various embodiments, the pilot can hover the cursor over the symbolic representation in order to "un-suppress" the associated text, notes, or symbols and access the information. In other scenarios, such as a criticality determination by the processor 108, as described hereinabove, a symbolic representation may expand out onto the screen automatically.

Range selection affects the display of chart data elements according to their assigned priority. Chart data elements having a critical priority may not be suppressed at any time. However, chart data elements designated by the pilot to belong to priority one or priority two may be suppressed based on user input, such as the range. In an exemplary embodiment, in the display of priority two chart data elements, everything more than a range of ten miles away from the aircraft may be suppressed. In another exemplary embodiment, in the display of priority one chart data elements, everything more than a range of twenty-five miles away from the aircraft may be suppressed.

If a critical procedure element is moved off of a display as a result of a pilot range adjustment (i.e., zoom in), the decluttering system 100 will designate the critical off-screen procedure element with a representative symbol. In addition, when a range higher (zoom out) adjustment shrinks an object beyond the ability to readably display associated text, the decluttering system 100 responds by rotating the text away from its object, displaying the text in a readable font size, and attaching the text to the object with a pointer. As with all modifications of the displayed views described herein, the views are updated as follows: the processor 108 directs the graphics module 104 to generate the modified combination of chart data and flight data (such as a zoom in, zoom out, or addition of a symbolic representation) that is displayed on display device 102 in response to the user input (such as a range change).

Decluttering system 100 may also display pointers without arrowheads. In response to user input at the user interface 110, the processor 108 may direct the graphics module 104 to alter the form of the pointer displayed on the display device 102. The directionality of the pointer is maintained by displaying an outlined, transparent segment, under a note or symbol, and increasing the opacity of the pointer as it gets closer to the associated data. The symbolic indicators and the pointers without arrowheads aid in decluttering the aircraft display.

At STEP 218, the pilot may attach a supplied note to a location on the lateral moving map or the pilot may generate a customized note and also 'tag' a note to stickpin the note onto the moving navigation display. This feature is sometimes referred to as "stick pin" notes. At STEP 220, the pilot enters the note and any additional constraints. At STEP 222 the pilot determines what notes to display and at STEP 224, when the constraints are met, the notes set up at STEP 220 are displayed under associated constraints.

Pilots generally utilize notes as follows. A pilot can select a chart note from the notes log (point and click) which places that note into "MY NOTES". "MY NOTES" is a user specific note location that allows the pilot to create a customized log of notes that the pilot deems most relevant to that particular flight. "MY NOTES" also allows the pilot to create a customized note that is not contained in the chart database. For instance, based on previous experience, the pilot may want to note that the destination airfield often has birds off the end of a runway that can present a flight hazard. The pilot can also 'tag' this note to stickpin the note onto the moving navigation display. Attaching "stick pin" notes as provided in STEP 218 serves as a prompt, or reminder of information, so that the pilot does not have to return to the "notes log" to obtain that information. These notes may also have constraints applied to them that controls when the note is displayed. The constraint could be phase of flight, distance to and from, time to and from or other constraints.

The decluttering system 100 will suppress and/or minimize the note until which time the aircraft is proximate to the location of attachment, or until the pilot hovers the cursor over the location of the attachment. If notes are attached to the lateral moving map, the note is entered at STEP 220 and the display is updated respectively at STEP 224. Any pilot-added notes are automatically added to the chart data "note manager," to the pilot's chart data custom notes, called "my notes," and stored with the rest of the pilot input preferences in the database 106. At STEP 226 the system determines whether to change the font size or label orientation. At STEP 228, the display is updated to reflect any font or label customization.

After any of the above customization STEPs are completed, and in response to user input, the pilot's customized display preferences may be saved and stored in the database 106 for reuse on another flight. Saving and storing the pilot's customized display preferences provides a unique ability to customize aircraft display information on a pilot-by-pilot basis, as well as to customize aircraft display for individual trips or airports. This offers a unique opportunity to save and reuse mission specific data.

In order to provide pilots with necessary information to execute any instrument procedure, the information must convey the procedure effectively and accurately; both aesthetically and functionally, by providing an intuitive and readable display of relevant information. Some of the pilot preferences herein described are used to improve the intuitive and readable nature of the display, thereby customizing the display. Understandably, there is also a temporal component to the presentation of information on the display, because the pilot will most likely be transitioning through and between the various phases of flight described in FIG. 1. The decluttering system described herein accommodates the temporal component, by adhering to pilot preferences, obtained as user input data, while continually blending flight data with chart data and displaying the modified combination of data on a singular aircraft display. As the ownship progresses through the procedures, the procedure specific information can be presented to the pilot as it is needed. This process of providing procedural based information to the pilot on a temporal demand can generate a much more efficient process of information management in the cockpit thereby reducing the overall cockpit information density displayed to the pilot and leading to a more intuitive and readable display of relevant information. As such, the decluttering system described herein reduces the cognitive workload of a pilot, increasing safety.

FIG. 3 illustrates an exemplary layer selection display 300. As described above, when the pilot turns on the DDC layer at STEP 206, the decluttering system 100 displays various procedures and procedure elements that may be optionally selected as layer one or layer two in STEP 208. As introduced hereinabove, elements assigned by the pilot as priority one are to be selected in layer one, and elements assigned as priority two are to be selected in layer two. FIG. 3 depicts the Minimum Area/Selector Altitudes procedure 304 being selected for layer 1. Within procedure 304, layer 1box 302 is shown selected. A Minimum Area/Selector Altitudes element, MSA Displayed, is selected at box 308. A second procedure 306 is displayed, as well as multiple other procedures filling up the selection display 300.

FIGS. 4-9 show exemplary aircraft display screens illustrating various decluttering capabilities provided by decluttering system 100, as described herein above. For brevity and clarity of figures, flight path displays may be truncated in illustrations below. In practice, the display seen by the pilot may contain the full flight path, including additional notes and symbols. In addition, for brevity and clarity of figures, the textual content of notes may be shown as simply, "note x," but in practice, "note x" may include symbolic and/or textual instructions or information. As utilized herein, notes may be textual notes, and they may also be chart data labels, chart notes, pilot generated notes or some combination thereof. FIGS. 4-9 include symbols used to represent objects such as hexagons for NAVAID or ground based VOR stations, circles with a bumped ridge representing airports, triangles representing intersections, etc.

Figure 4:
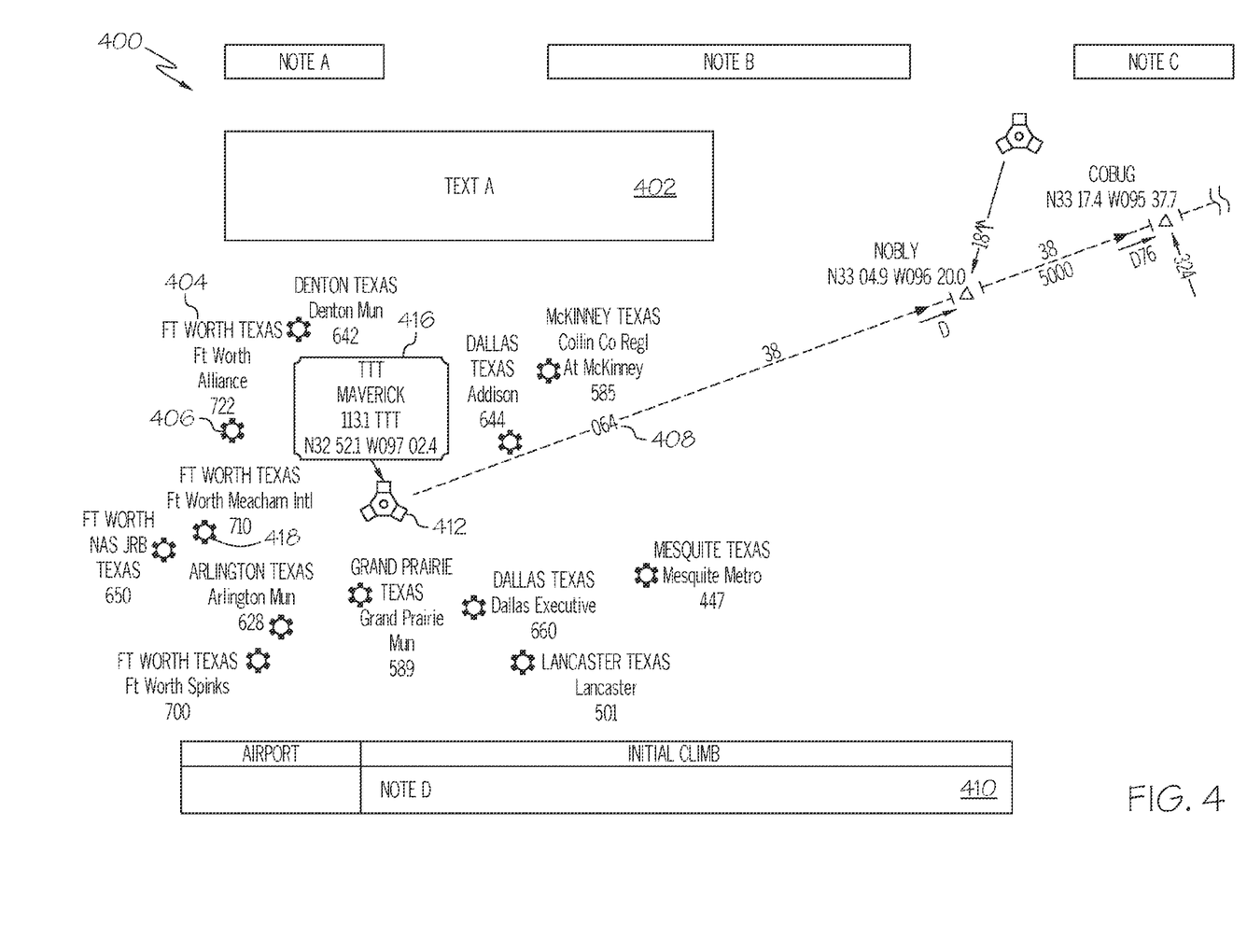
FIG. 4 illustrates an exemplary aircraft display screen in accordance with an exemplary embodiment.
Figure 5:
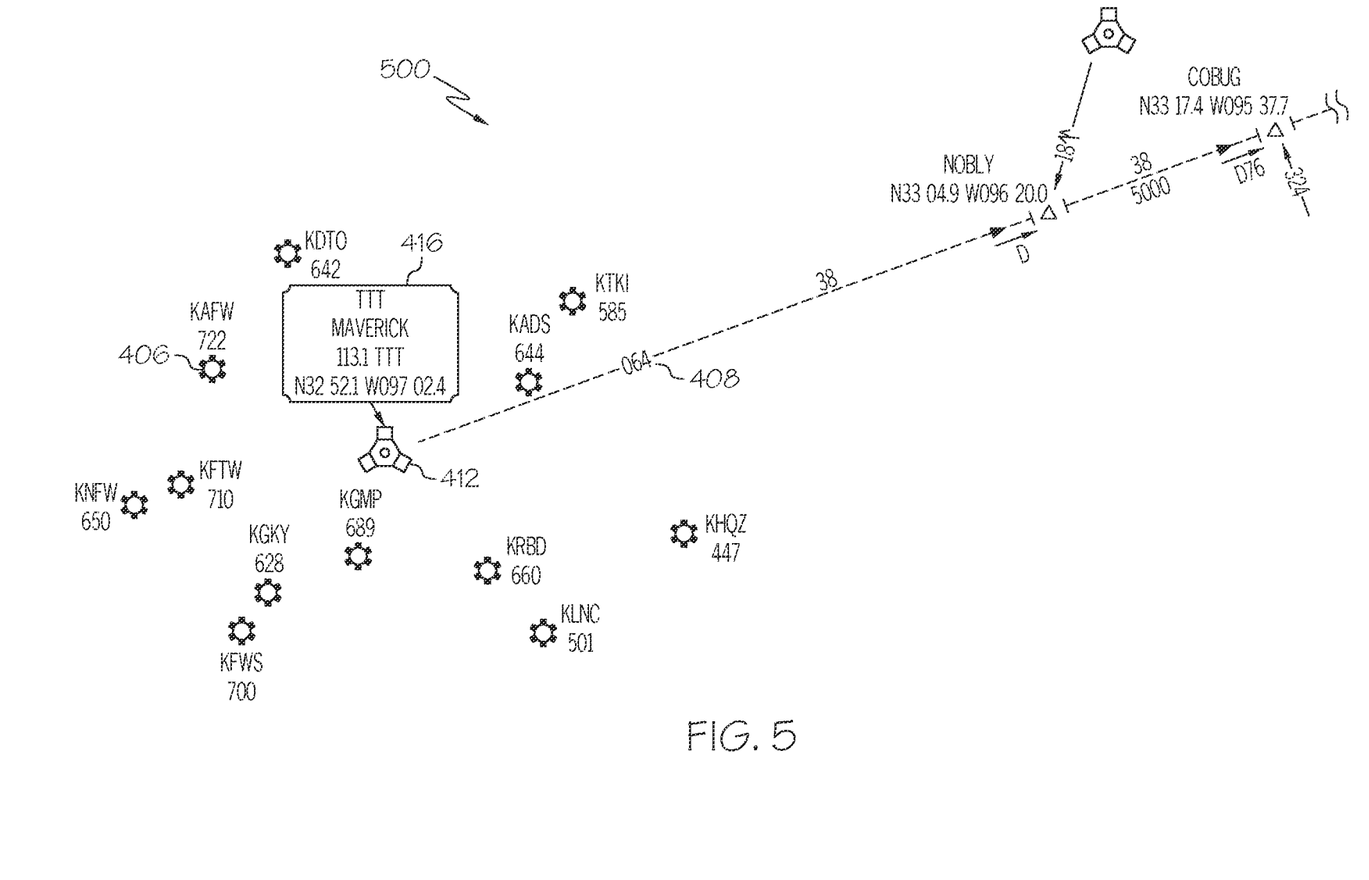
FIG. 5 illustrates a further exemplary aircraft display screen in accordance with an exemplary embodiment.

FIG. 4 and FIG. 5 should be viewed together. FIG. 4 illustrates an exemplary aircraft display screen 400 in accordance with an exemplary embodiment. Aircraft display screen 400 is a portion of exemplary digitized chart data for a departure procedure for departure airport 418, a VOR/DME NAVAID 412, with a note 416 that is a chart data element, and a flight course line 408. Aircraft display screen 400 includes text A 402, and a table 410 containing note D. Text A 402 and table 410 may contain various dialogue or notes, such as instructions for obstacle clearance. A VOR/DME NAVAID 412 is shown. A note 404, associated with object 406, is displayed. As is apparent, aircraft display screen 400 is cluttered with various notes, symbols, tables, and text. As shown, there are notes above text A 402, and there are symbols with associated notes between table 410 and VOR/DME NAVAID 412. Aircraft display screen 400 is generated according to the flight management system (FMS) in response to the pilot entering departure and destination airports into the FMS. The FMS performs a first level of decluttering on flight data by removing flight paths and associated procedures leading to all other destinations. FIG. 5 illustrates how decluttering system 100 can declutter aircraft display screen 400.

FIG. 5 illustrates a further exemplary aircraft display screen 500 in accordance with an exemplary embodiment. Aircraft display screen 500 results from utilizing decluttering system 100 on the portion of departure procedure shown in aircraft display screen 400. The VOR/DME NAVAID 412 is shown, along with the associated note 416. The flight course line 408 is shown. As can be seen, the decluttering system 100 has removed clutter by suppressing notes from a plurality objects near the departure airport. In comparison with FIG. 4, the note 404 associated with object 406 has been removed.

Figure 6:
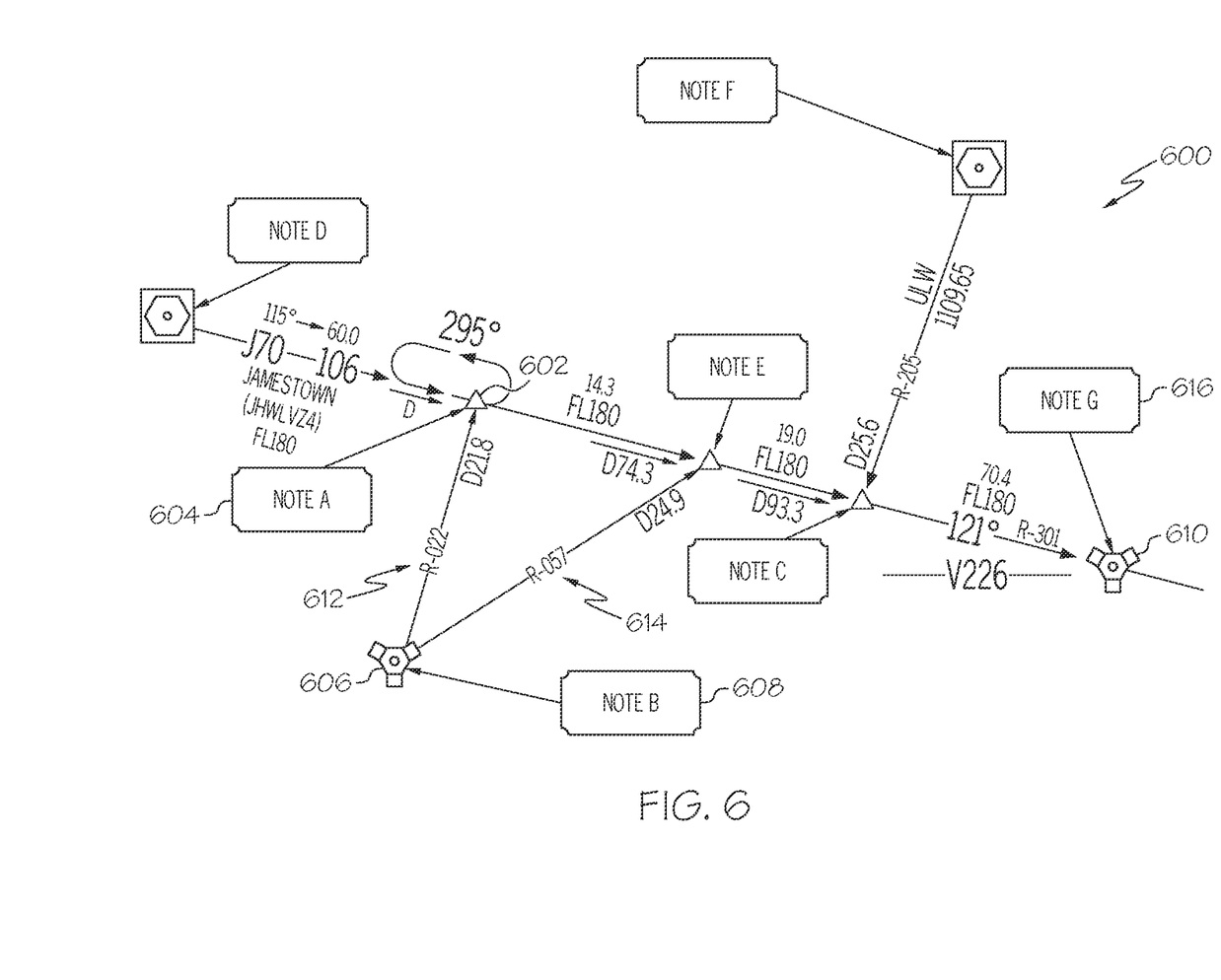
FIG. 6 illustrates a still further exemplary aircraft display screen in accordance with an exemplary embodiment.
Figure 7:
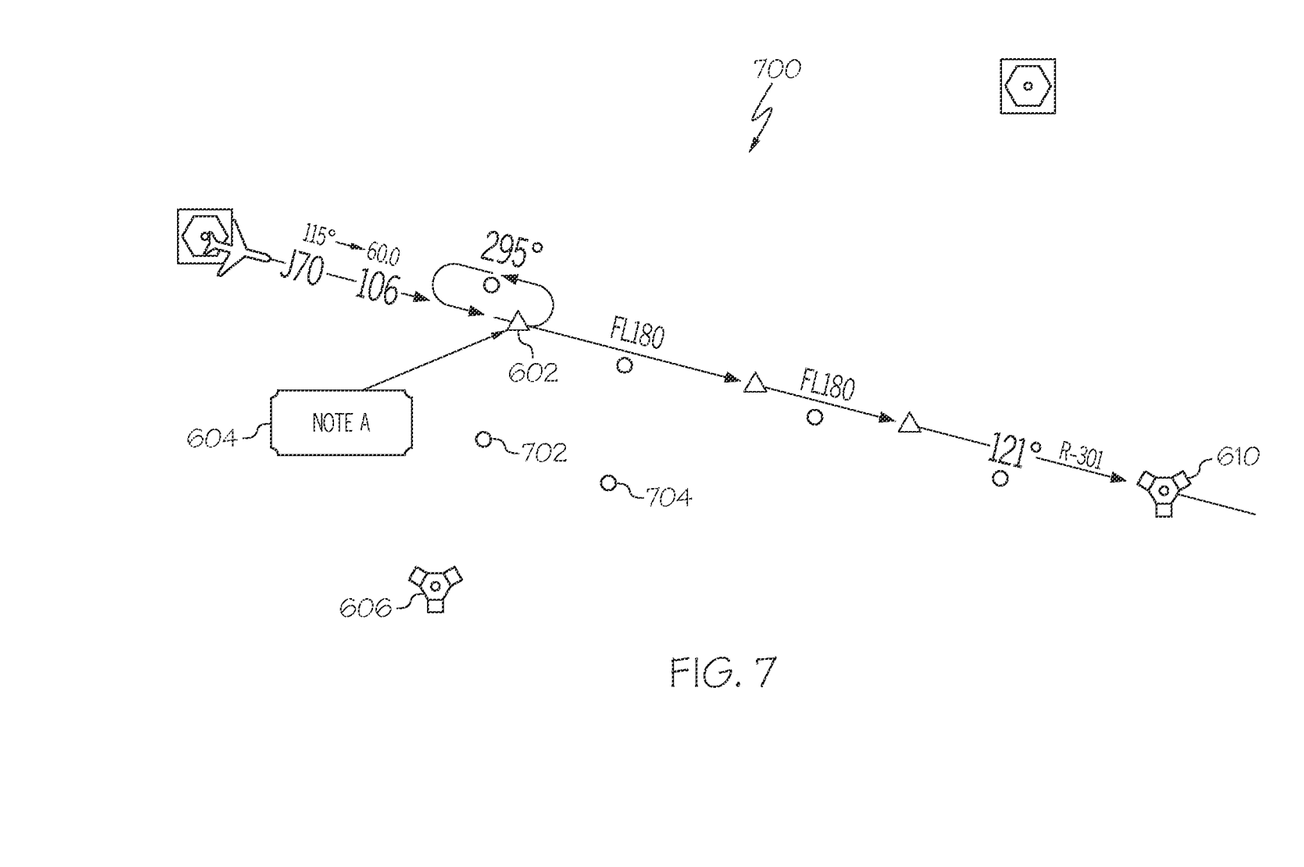
FIG. 7 illustrates yet another exemplary aircraft display screen in accordance with an exemplary embodiment.

FIG. 6 and FIG. 7 should be viewed together. FIG. 6 illustrates a still further exemplary aircraft display screen 600 in accordance with an exemplary embodiment. Aircraft display screen 600 is a partial display that includes hot spot 602, with associated note A 604. Hot spots refer to ICONs that, when hovered over, display additional information. Hot spot 606 has note B 608 associated with it, as well as an associated VOR radial with bearing number at arrow 612 and VOR radial with bearing number at arrow 614. The VOR radials are used to create and identify intersections on a route segment on a given procedure. Again, note A 604, note B 608 and note G 616 may be chart data labels, chart notes, pilot generated notes or some combination thereof.

Object 610 has an associated note G 616. FIG. 7 illustrates how decluttering system 100 declutters Aircraft display screen 600.

Figure 8:
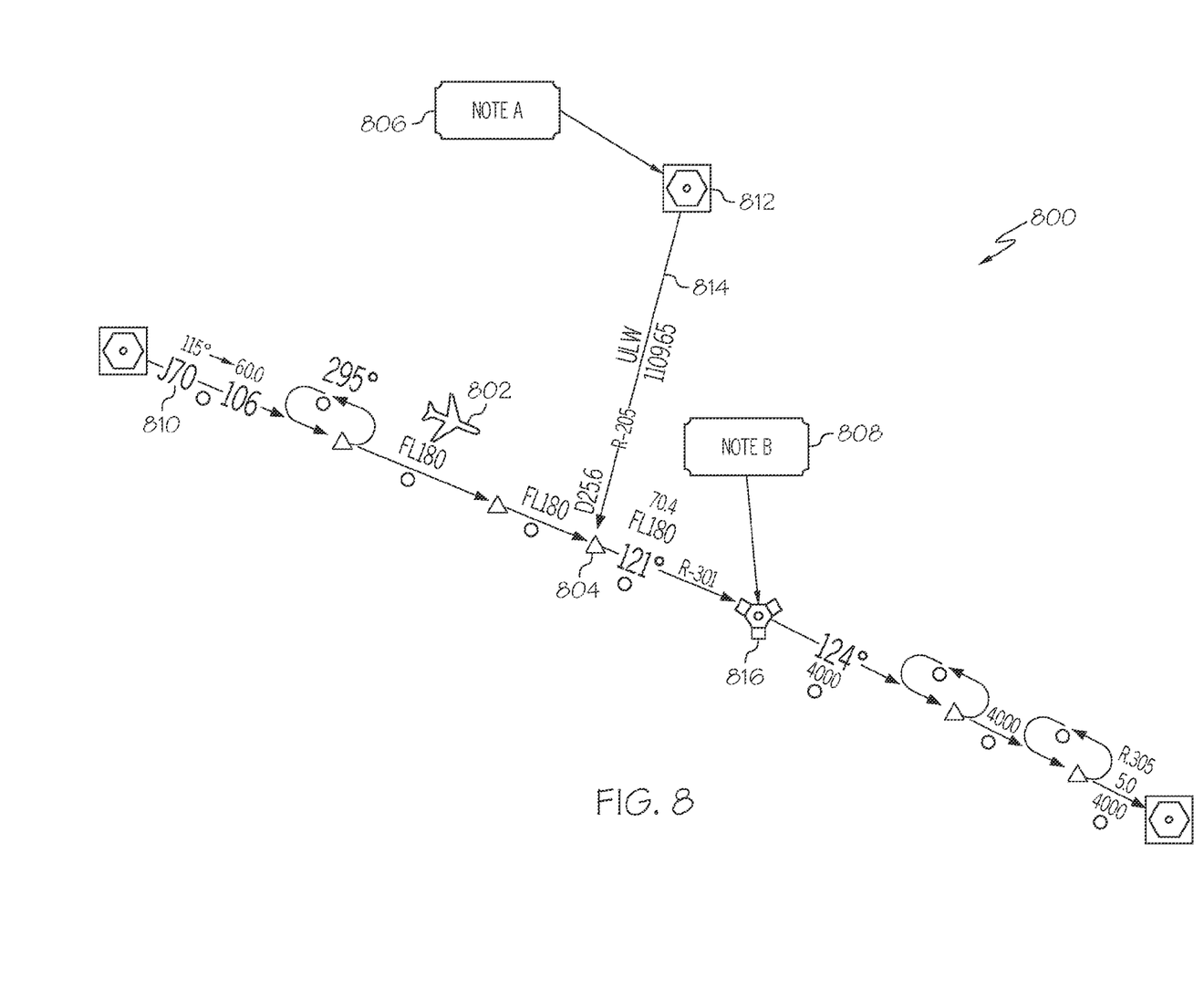
FIG. 8 illustrates a further exemplary aircraft display screen in accordance with an exemplary embodiment.
Figure 9:
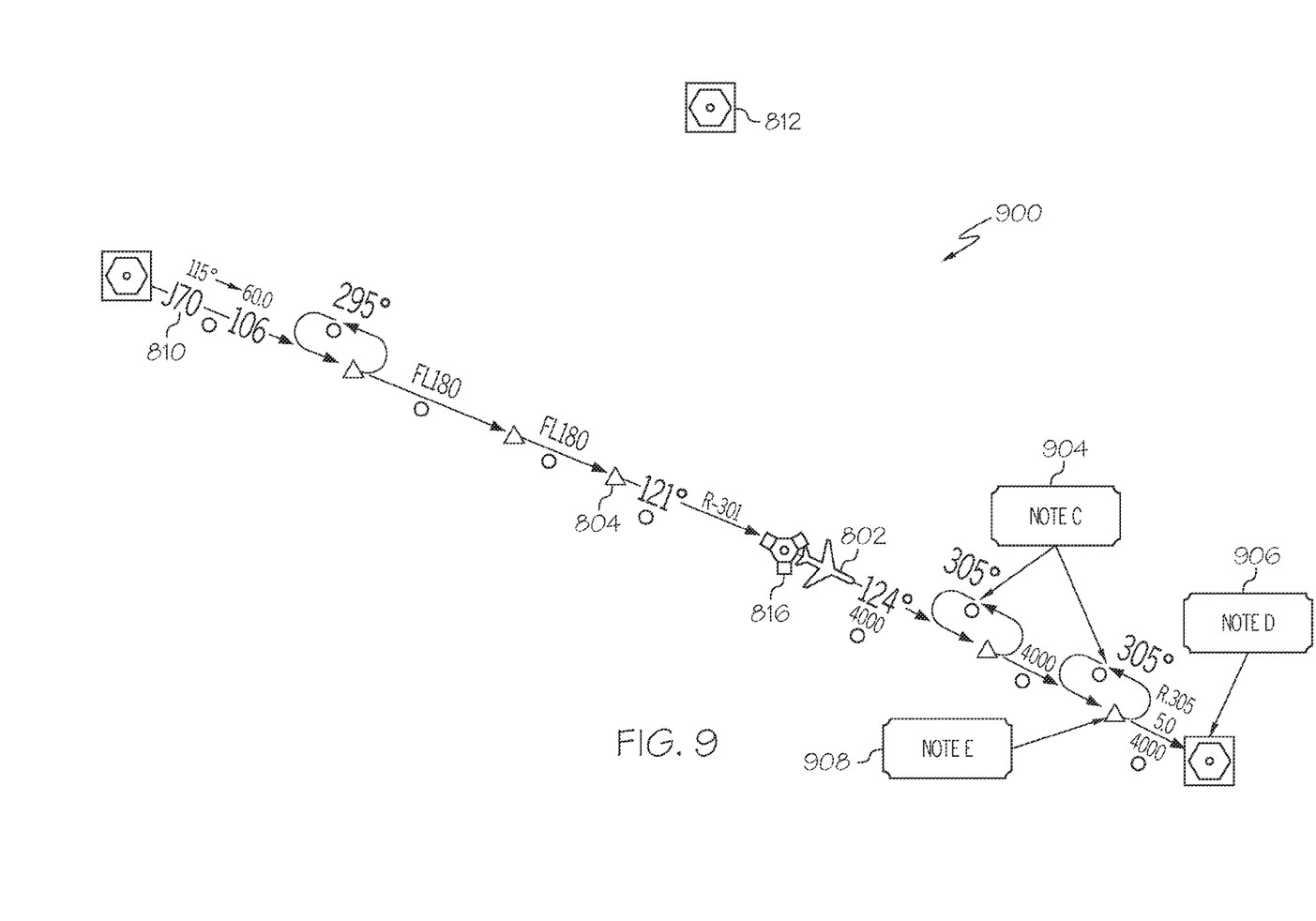
FIG. 9 illustrates yet another exemplary aircraft display screen in accordance with an exemplary embodiment.

FIG. 7 illustrates yet another exemplary aircraft display screen 700 in accordance with an exemplary embodiment. Aircraft display screen 700 is exemplary result from utilizing decluttering system 100 on the displayed image shown in aircraft display screen 600. In aircraft display screen 700 the notes that are visible in FIG. 6 are suppressed. Note A 604 is displayed to illustrate the results of a pilot utilized cursor movement commonly referred to as hovering. As shown, the pilot hovered the cursor over hot spot 602. Likewise, procedure notes, such as those associated with object 610 and hot spot 606, are suppressed and will be displayed when the cursor is hovered over the associated objects or symbols. In FIGS. 7, 8 and 9, the dots, such as symbol 702 and symbol 704 indicate that textual information has been suppressed. This information is displayed when the pilot hovers his cursor over a dot symbol for a chart element, or when the ownship gets in close proximity of a chart data element. Referring back to FIG. 6, the suppressed information is shown at arrow 612 and arrow 614. A comparison of FIG. 6 to FIG. 7 illustrates the suppression of various kinds of notes, and the pilot's ability to display notes by hovering the cursor over symbols that represent locations for notes or information.

FIG. 8 and FIG. 9 are to be viewed together. FIG. 8 illustrates a further exemplary aircraft display screen 800 in accordance with an exemplary embodiment. Aircraft 802 is shown on a flight path 810. Critical notes automatically pop up ahead of the aircraft 802 as the aircraft gets close to the location on the moving map of the note attachment. In this example, the aircraft is proximate to the location of attachment for notes 806 and 808. Aircraft display screen 800 shows note 806, associated with a symbol for a VOR NAVAID with Distance Measuring Equipment (VORDME) 812, displayed. Information associated with VORDME 812 and route intersection 804 is also displayed. In addition, note 808 associated with VORTAC 816, is displayed. VORTAC is the acronym for a VOR with TACAN frequencies, which is used by the military. As with all of the notes described in the figures herein, note 806 may be a chart data label, chart note, pilot generated note or some combination thereof.

FIG. 9 illustrates yet another exemplary aircraft display screen 900 in accordance with an exemplary embodiment. In FIG. 9, aircraft 802 is shown on a new location on flight path 810, as compared to the aircraft 802 location shown in FIG. 8. In comparison with FIG. 8, the aircraft 802 has moved beyond intersection 804 and VORTAC 816, in response to which the critical notes associated with intersection 804 and VORTAC 816 are suppressed. However, in response to the new location of aircraft 802, new critical notes are automatically displayed. For example, critical note 904, critical note 906 and critical note 908, associated with corresponding hot spots, are displayed.

Thus, there has been provided a pilot centered decluttering system and method that blends flight data with chart data, according to pilot input, and displays the modified result. The decluttering system is also responsive to pilot preferences such as controlling font size, placing notes at specific locations on the moving map, and controlling the location and orientation of text on the screen. The provided decluttering system allows a pilot to quickly scan and acquire all of the necessary information needed to execute relevant procedures.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

What is claimed is:
1. A pilot-centered method for displaying information on an aircraft display, the method executable by a processor and comprising:
   obtaining chart data from a chart data source;
   obtaining flight data comprising a flight path from a flight data source;
   obtaining aircraft location data;
   displaying a menu presenting chart data elements;

obtaining user input data responsive to the menu, wherein the user input data identifies (i) a first chart data element as a first priority, and (ii) a second chart data element as a second priority;

generating, by the processor, a first priority view that is customized according to the user identified first priority chart data element, flight data, and the aircraft location data;

generating, by the processor, a second priority view that is customized according to the user identified second priority chart data element, flight data, and the aircraft location data; and toggling between displaying, on the aircraft display, (i) a map overlaid with symbology that is graphically representative of the first priority view and (ii) a map that is overlaid with symbology that is graphically representative of the second priority view, in response to a user input.

2. The method of claim 1, wherein the step of generating a first priority view further comprises filtering chart data according to user input identifying a plurality of chart data as first priority data.

3. The method of claim 1, wherein the step of generating a second priority view further comprises generating a symbolic representation of a predetermined subset of chart data identified as second priority chart data.

4. The method of claim 1, wherein the step of obtaining user input data further comprises recognizing a location and movement of a cursor with respect to the aircraft display.

5. The method of claim 4, further comprising selectively displaying symbology in accordance with a location and movement of the cursor.

6. A pilot-centered system for displaying information on an aircraft display, the system comprising:
   a source of flight data comprising a flight path;
   a source of aircraft location data;
   a source of chart data;
   a graphics module coupled to the source of chart data, source of aircraft location data, and the source of flight data;
   a user interface configured to obtain user input data; and
   a processor coupled to the graphics module and user interface, the processor configured to (i) display a menu presenting chart data elements, (ii) obtain user input data responsive to the menu, wherein the user input data identifies a first chart data element as a first priority and a second chart data element as a second priority, (iii) direct the graphics module to generate (a) a first priority view that is customized according to the user identified first priority chart data element, the flight data, and the aircraft location data and (b) a second priority view that is customized according to the user identified second priority chart data element, the flight data, and the aircraft location data, and (iv) command the aircraft display to toggle between displaying (i) a map overlaid with symbology that is graphically representative of the first priority view and (ii) a map that is overlaid with symbology that is graphically representative of the second priority view, in response to a user input.

7. The system of claim 6, wherein the user interface comprises at least one of a keyboard, a touch screen display, a mouse and a stored data file.

8. The system of claim 6, further comprising a database coupled to the processor, the database configured to store user input data.

9. The method of claim 1, further comprising:
   creating a user specific notes location; and
   placing a user selected chart note into the user specific notes location in response to the user selecting the chart note.

10. The method of claim 1, further comprising:
    receiving a user customized note and user supplied location on a lateral moving map; and
    placing the user customized note at the location on the lateral moving note.

11. The system of claim 6, wherein the processor is further configured to:
    create a user specific notes location; and
    command the display device to display a chart note in the user specific notes location in response to the user selecting the chart note.

12. The system of claim 6, wherein the processor is further configured to:
    receive a user customized note and user supplied location on a lateral moving map; and
    command the display device to display the user customized note at the location on the lateral moving note.

* * * * *